United States Patent [19]

Fujii et al.

[11] Patent Number: 4,765,433
[45] Date of Patent: Aug. 23, 1988

[54] FOUR WHEEL DRIVE VEHICLE WITH ANTILOCK BRAKE DEVICE AND ASSOCIATED METHOD OPERATION

[75] Inventors: Etsuo Fujii; Makoto Sato, both of Wako, Japan

[73] Assignee: Honda Giken Kogyo Kabushiki Kaisha, Tokyo, Japan

[21] Appl. No.: 927,052

[22] Filed: Nov. 4, 1986

[30] Foreign Application Priority Data

Nov. 6, 1985 [JP] Japan .................. 60-248400

[51] Int. Cl.$^4$ .................. B60K 17/356; B60K 17/34
[52] U.S. Cl. .................. 180/244; 180/233; 188/2 R
[58] Field of Search .................. 303/119, 6 C, 10, 6 R; 180/244, 233; 188/67, 2 R, 10, 347, 156

[56] References Cited

U.S. PATENT DOCUMENTS

| | | | |
|---|---|---|---|
| 3,075,405 | 1/1963 | Hill et al. | 180/244 |
| 3,081,836 | 3/1963 | Hill | 180/244 |
| 4,254,845 | 3/1981 | Braun | 180/244 |
| 4,466,519 | 8/1984 | Romer | 180/244 X |
| 4,626,042 | 12/1986 | Burckhardt | 303/6 C |
| 4,668,023 | 5/1987 | Every | 303/119 X |

Primary Examiner—James T. McCall
Attorney, Agent, or Firm—Roberts, Spiecens & Cohen

[57] ABSTRACT

An antilock brake method and device for a four wheel drive vehicle having front and rear axles, left and right wheels on each axle with brakes associated with each wheel, a power unit drivingly connected to one of the axles, the other axle being coupled for drive together with the driven axle, a hydraulic braking system for controlling the hydraulic pressure applied to the brakes, and an antilock control system coupled to the braking system for controlling the hydraulic braking pressure to reduce the brake pressure when a wheel is about to be locked. The antilock control system includes a front wheel control section for controlling the brakes of the front wheels, a rear wheel control section for controlling the brakes of the rear wheels, and circuit elements included in the front and rear wheel control sections for keeping the hyraulic braking pressure reduced up to the completion of a braking operation, when any of the wheels is about to be locked. In a particular embodiment the rear wheel control section reduces the braking pressure in the rear wheel brakes and maintains the pressure reduced during a braking operation when any of the wheels is about to be locked.

18 Claims, 6 Drawing Sheets

FIG.5A (a) (b)

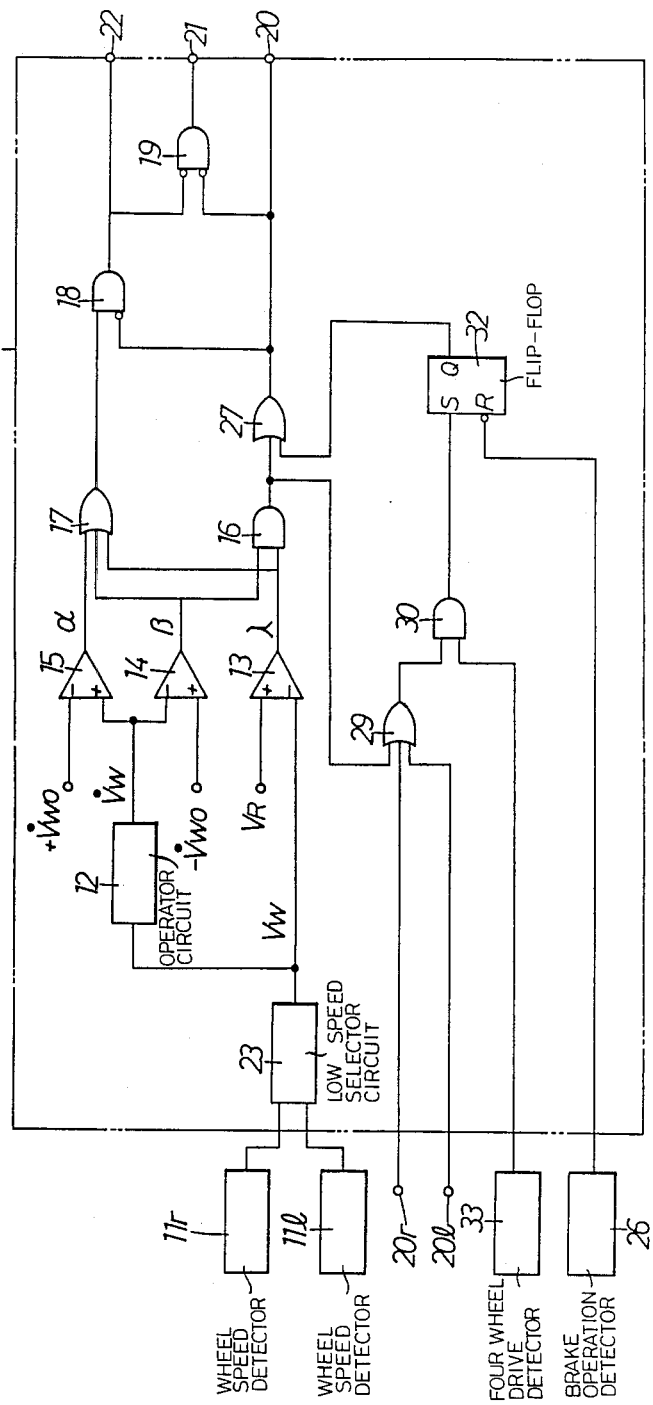

FOUR WHEEL DRIVE VEHICLE WITH ANTILOCK BRAKE DEVICE AND ASSOCIATED METHOD OPERATION

FIELD OF THE INVENTION

The present invention relates to a four wheel drive vehicle with an antilock brake device, in which a power unit is connected to either one of the front and rear axles, with the other axle being connected to said one axle in intercoupled associated relation such that the drive of the axles interferes with each other, and an antilock control unit for controlling the braking hydraulic pressure to reduce the pressure when a wheel is about to be locked, said antilock control unit being associated with a braking hydraulic pressure system for controlling the hydraulic pressure of the brakes respectively mounted on each axle.

The invention further relates to a method of operation of the antilock brake device.

Incidentally, it should be noted here that throughout the specification when it is described that the axles interfere with each other, this means that the axles are in four-wheel drive state having a substantially rigid interconnection therebetween and the application of the brakes on the wheels of one axle will have effect on the drive of the wheels of the other axle.

DESCRIPTION OF THE PRIOR ART

In the conventional four wheel drive vehicle improvements are sought in the operating and travel performance on a road surface having a low friction coefficient, and attempts have been made to employ an antilock brake device on the four wheel drive vehicle.

However, if an antilock control brake device as employed in the conventional two wheel drive vehicle is used in a four wheel drive vehicle, a disadvantage is produced in that, in the four wheel drive vehicle, the front and rear wheels interfere with each other and consequently, a satisfactory antilock effect cannot be obtained.

SUMMARY OF THE INVENTION

An object of the present invention is to overcome the above disadvantage of providing a four wheel drive vehicle with an antilock brake device in which the antilock control of the front and rear wheels is achieved efficiently and effectively.

According to the present invention, an antilock control device is provided which includes a front wheel control section for controlling the brakes for the front wheels and a rear wheel control section for controlling the brakes for the rear wheels, and the front and rear wheel control sections are of such a contruction that the braking hydraulic pressure of the rear brake is maintained at reduced pressure up to the completion of the braking operation, when any of the wheels is about to be locked.

During antilock control, the hydraulic braking pressure of the rear brake is reduced and therefore, the antilock control of the rear wheels can be insured by effecting the antilock control of the front wheels, thus providing a satisfactory antilock effect.

BRIEF DESCRIPTION OF THE FIGURES OF THE DRAWING

FIG. 5A is a diagram illustrating the characteristic of a delay circuit in the circuit of FIG. 5.

FIG. 6 is a schematic circuit diagram of a rear wheel control section according to a third embodiment of the invention.

DETAILED DESCRIPTION OF PREFERRED EMBODIMENTS

Figure 1:
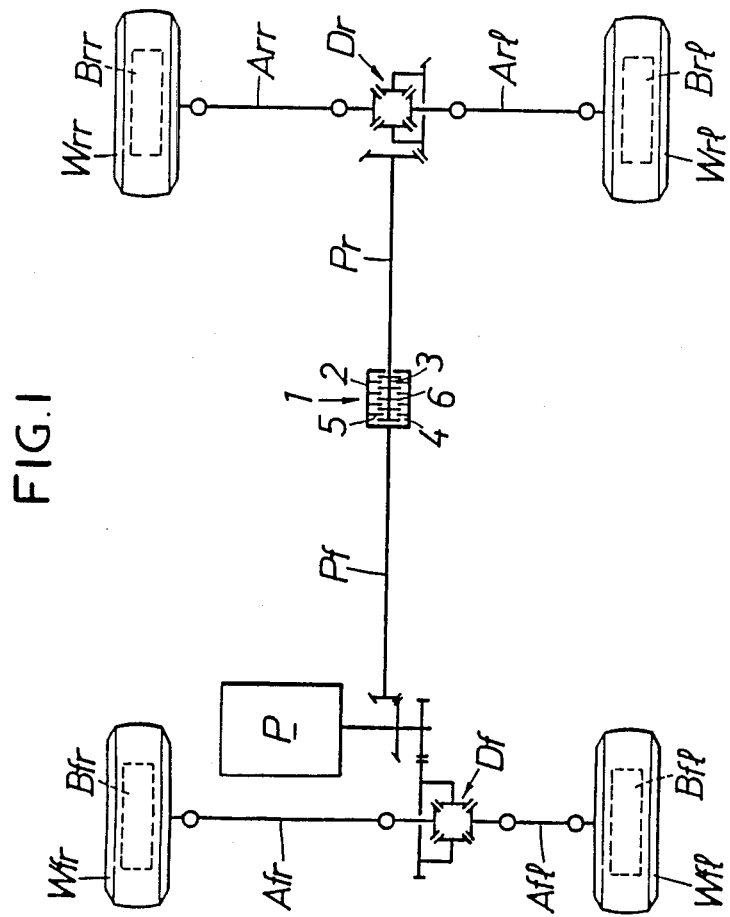
FIG. 1 is a schematic diagram of a four wheel drive system.

The present invention will now be described with reference to the embodiments illustrated in the accompanying drawing. Referring first to FIG. 1 illustrating a first embodiment of the present invention, a pair of left and right front wheels Wfl and Wfr and a pair of left and right rear wheels Wrl and Wrr are suspended respectively at the front and rear portions of a body of a vehicle (not shown).

A pair of front axles Afl and Afr, which are connected respectively to the left and right front wheels Wfl and Wfr, are interconnected through a front differential Df, and a pair of rear axles Arl and Arr, which are connected respectively to the left and right rear wheels Wrl and Wrr, are interconnected a rear differential Dr. The input of the front differential Df is connected to the power unit P. The input of the rear differential Dr is connected to a rear propeller shaft Pr which is coaxially connected to a front prepeller shaft Pf through a viscous clutch 1 serving as a torque transmitting mechanism, and the drive force from the power unit P is transmitted to the front propeller shaft Pf.

The viscous clutch 1 includes a closed oil chamber 4 containing inner and outer clutch elements 2 and 3 which are rotatable relative to each other. A highly viscous oil with a small amount of air to permit the thermal expansion of the highly viscous oil is sealed in the closed oil chamber 4. The viscous clutch 1 also includes a plurality of outer clutch plates 5 spline-connected to the outer clutch element 2 and a plurality of inner clutch plates 6 spline-connected to the inner clutch element 3, the inner and outer clutch plates being interleaved with each other. Each of the plates 5 and 6 is provided with an opening or groove (not shown) which permits the passage of the oil. The outer clutch element 2 is integral with the front propeller shaft Pf, and the inner clutch element 3 is integral with the rear propeller shaft Pr.

In the viscous clutch 1, when relative rotation occurs between the outer clutch element 2 and the inner clutch element 3, both the clutch plates 5 and 6 rotate relative to one another while shearing the highly viscous oil, so that the viscous transmission of torque is obtained between the clutch plates 5 and 6. When the speed of the relative rotation is further increased, a complex temperature gradient is produced in both clutch plates 5 and 6 due to the increase in oil temperature, causing a synergistic effect of a strain attributable to this temperature gradient with an increase in pressure within the closed oil chamber 4 to provide a frictionally engaged portion or a portion having an extremely small gap between the adjacent clutch plates 5 and 6. As a result, the frictional transmission of torque is insured between the outer clutch element 2 and the inner clutch element 3.

With such a viscous clutch 1, the front propeller shaft Pf and the rear propeller shaft Pr and thus, the front axles Afl, Afr and the rear axles Arl, Arr are always in a substantially rigidly interconnected state, so that the front wheels Wfl, Wfr and the rear wheels Wrl, Wrr interfere with each other.

Brakes Bfl, Bfr are respectively mounted on the front wheels Wfl, Wfr, and brakes Brl, Brr are respectively mounted on the rear wheels Wfl, Wrr.

Figure 2:
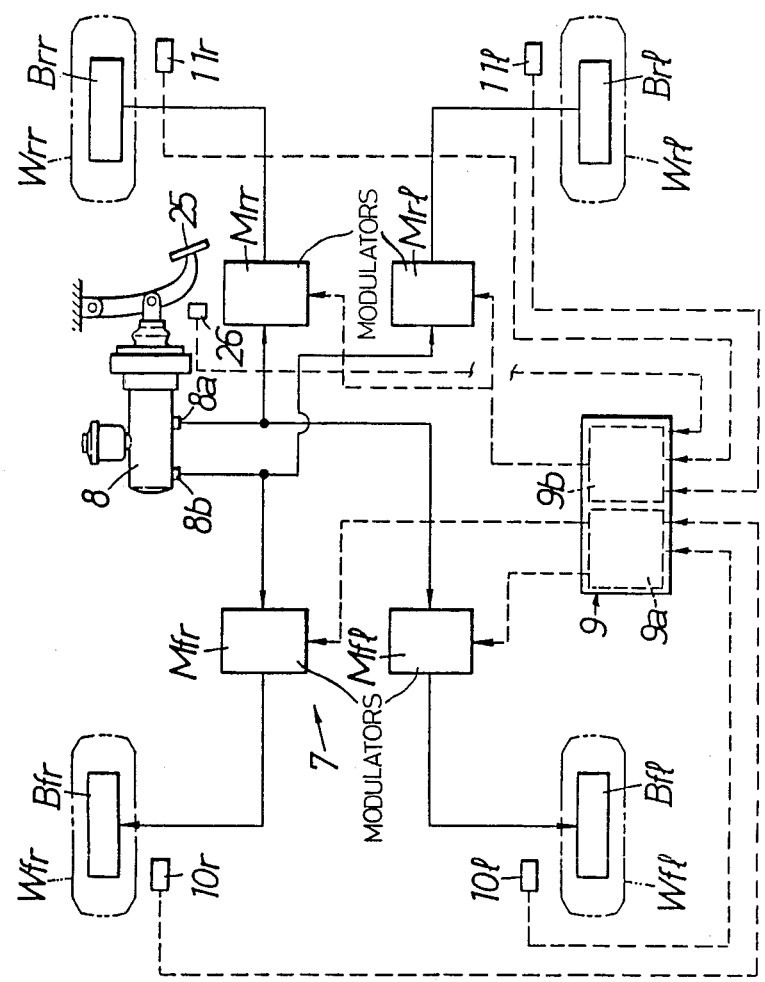
FIG. 2 is a block diagram of a brake system for the drive system in FIG. 1.

Referring to FIG. 2, a braking hydraulic pressure system 7 for controlling the hydraulic pressure of each of the brakes Bfl, Bfr, Brl and Brr comprises a tandem type master cylinder 8 having a pair of output ports 8a and 8b, modulators Mfl and Mrr for regulating the hydraulic pressure supplied from the output port 8a to transmit the pressure to the left front wheel brake Bfl and the right rear wheel brake Brr, and modulators Mfr and Mrl for regulating the hydraulic pressure supplied from the output port 8tb to transmit the pressure to the right front wheel brake Bfr and the left rear wheel brake Wrl. The braking hydraulic pressure system 7 is associated with an antilock control device 9 for controlling the operation of the modulators Mfl, Mfr, Mrl and Mrr to prevent the wheels from going into a locked state.

The antilock control device 9 includes a front wheel control section 9a for individually controlling the modulators Mfl and Mfr of the front wheels Wfl and Wfr, and a rear wheel control section 9b for simultaneously controlling the modulators Mrl and Mrr of the rear wheels Wrl and Wrr, so that signals from detectors 10*l* and 10*r* for detecting the speeds of the front wheels Wfl and Wfr are supplied to the front control section 9a, and signals from detectors 11*l*, and 11*r* for detecting the speeds of the rear wheels Wrl and Wrr are supplied to the rear control section 9b.

Figure 3:
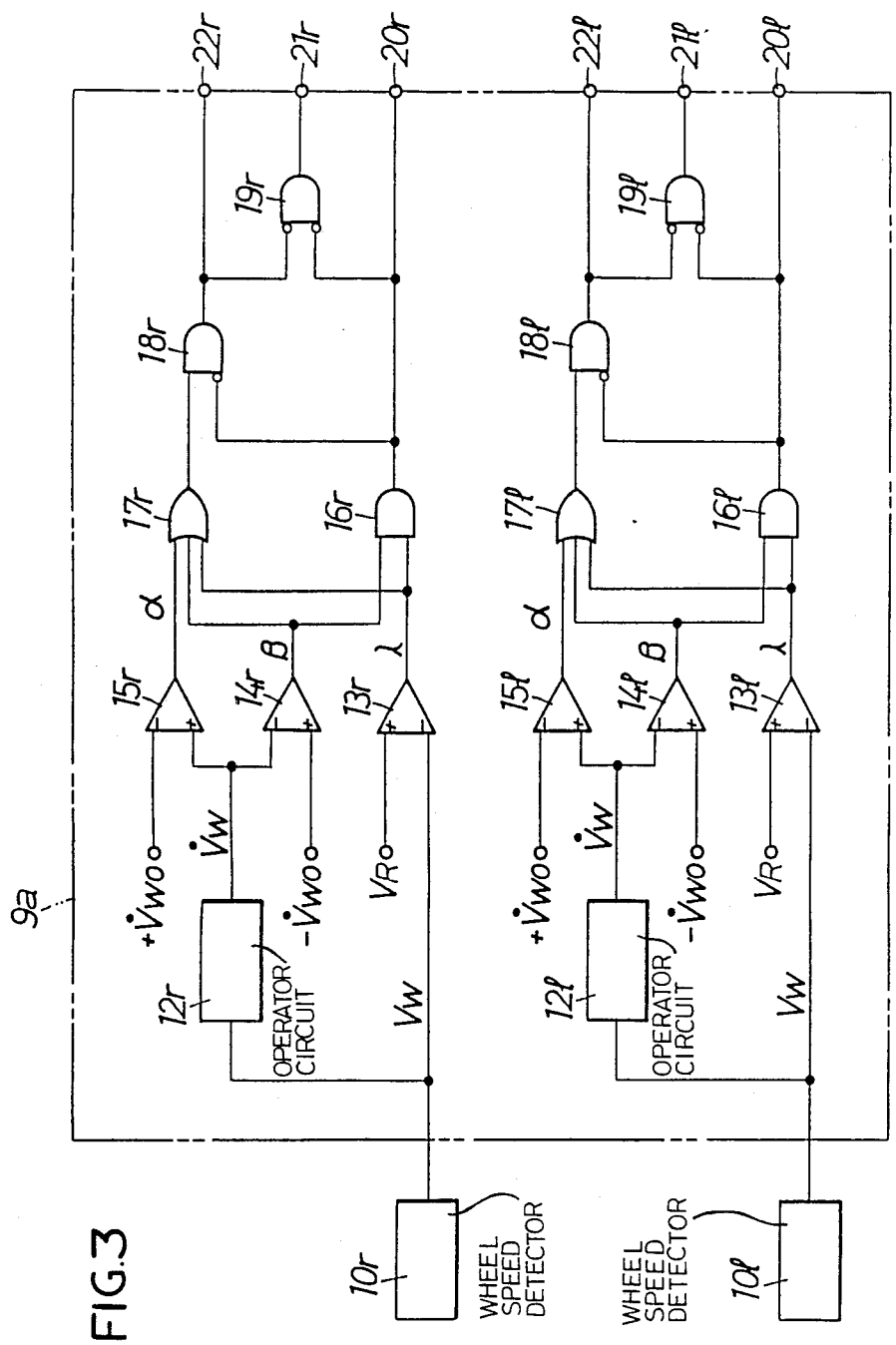
FIG. 3 is a schematic circuit diagram of a front wheel control section of the brake system in FIG. 2.

Reference is next made to FIG. 3 for the description of the arrangement of the front wheel control section 9a, wherein because the portion corresponding to one of the modulators Mfl is basically of the same construction as the portion corresponding to the other modulator Mfr, the parts associated with modulator Mfl are designated by addition of reference characters l and they will be explained hereinafter. Meanwhile, the parts associated with the modulator Mfr are designated by addition of reference characters r and their description will be omitted.

To determine whether the wheel is ready to go into the locked state, a signal representing wheel speed Vw detected in the detector 10*l* is fed to the inverse terminal of a first comparator 13*l* and to an operator circuit 12*l* in which a signal representing wheel acceleration Vw is produced and fed to the inverse terminal of a second comparator 14*l* and the non-inverse terminal of a third comparator 15*l*, respectively. In the first comparator 13*l*, the wheel speed Vw is compared with a reference wheel speed Vr stored in the non-inverse terminal thereof and when Vr>Vw, a signal λ for moderating the hydraulic braking pressure is delivered from the first comparator 13*l*. In the second comparator 14*l*, the wheel acceleration Vw is compared with a reference wheel deceleration $-Vw_O$ stored in the non-inverse terminal and when $-Vw_O>Vw$, a signal β for moderating the hydraulic pressure is delivered from the second comparator 14*l*. Further, in the third comparator 15*l*, the wheel acceleration Vw is compared with a reference wheel acceleration $+Vw_O$ stored in the inverse terminal and when $Vw>+Vw_O$, a signal α is delivered from the third comparator 15*l*. The signal α serves to check whether the wheel speed Vw is increasing, so that the period of time for which the moderation of the hydraulic braking presure is continued is determined by signal α.

The output terminal of the first comparator 13*l* is connected to the input terminal of an AND gate 16*l* and to the input terminal of an OR gate 17*l*. The output terminal of the second comparator 14*l* is connected to the input terminals of AND gate 16*l* and OR gate 17*l*. Further, the output terminal of the third comparator 15*l* is connected to the input terminal of OR gate 17*l*.

The output terminal of the AND gate 16*l* is invertedly connected to the input terminals of AND gates 18*l* and 19*l* and to an output terminal 20*l*. The output terminal of the OR gate 17*l* is connected to the input terminal of the AND gate 18*l* whose output terminal is connected to an output terminal 22*l* and invertendly connected to the input terminal of the AND gate 19*l*. Further, the output terminal of the AND gate 19*l* is connected to an output terminal 21*l*.

In the front control section 9a, a signal for reducing the braking pressure is delivered from the output terminals 20*l* and 20*r*, and a signal for increasing the braking pressure is delivered from the output terminals 21*l* and 21*r*, and further, a signal for maintaining the braking pressure constant is delivered from the output terminals 22*l* and 22*r*. The modulators Mfl is operated in response to the signals from the output terminals 20*l*, 21*l* and 22*l*, and the modulator Mfr is operated in response to the signals from the output terminals 20*r*, 21*r*, and 22*r*, whereby the antilock control operations are individually conducted for both the brakes Bfl and Bfr.

Figure 4:
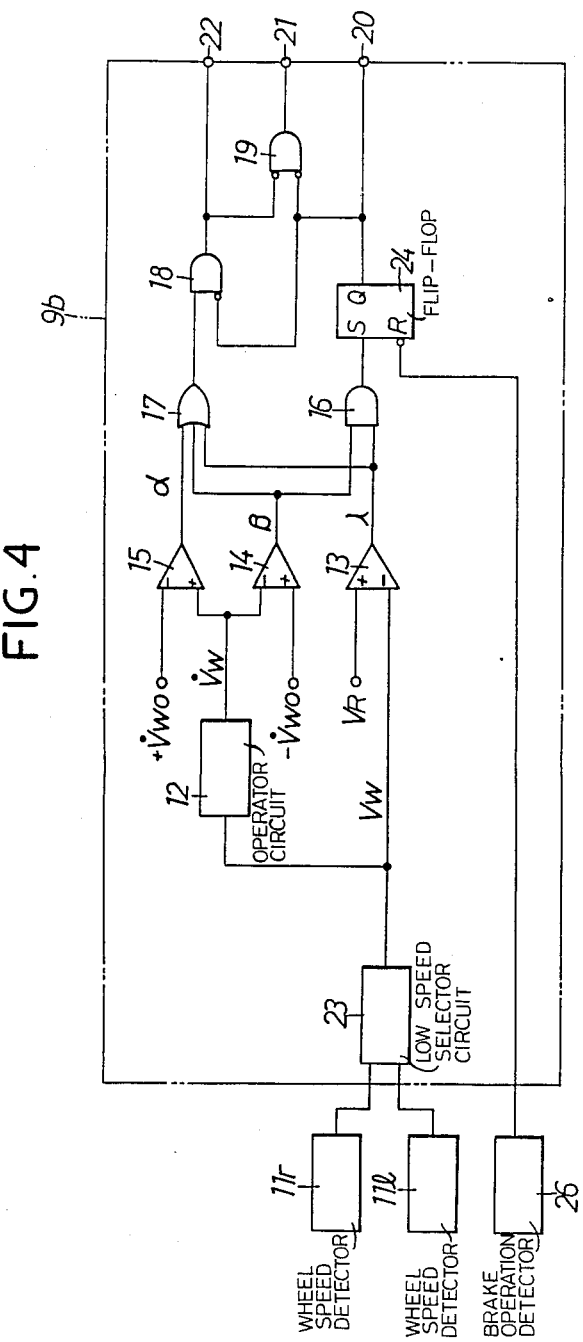
FIG. 4 is a schematic circuit diagram of a rear wheel control section of the brake system in FIG. 2

Description will next be made of the arrangement of the rear wheel control section 9b with reference to FIG. 4. The arrangement of the rear wheel control section 9b is similar to that of the front wheel control section 9a and hence, the parts corresponding to those of the front wheel control section 9a are designated by the same reference characters with no letter l or r affixed thereto.

Attention is directed in the rear wheel control section 9b to the arrangement in which the signals representing the wheel speeds detected in the detectors 11*l* and 11*r* are fed to a low speed selector circuit 23 and the lower wheel speed selected in the low speed selector circuit 23 is fed to the first comparator 13 and the operator circuit 12. More specifically, the antilock control is conducted in coordination to that one of the left and right rear wheels Wrl and Wrr which is more easily locked, i.e., the wheel having the lower speed, and the activation of both modulators Mrl and Mrr are simultaneously controlled through control signals derived from the output terminals 20, 21 and 22.

Moreover, in the rear wheel control section 9b, a flip-flop 24 is interposed between the AND gate 16 and the AND gates 18 and 19 as well as the output terminal 20. More particularly, the output terminal of the AND gate 16 is connected to a set input terminal S of the flip-flop 24 whose set output terminal Q is connected to the output terminal 20 and invertedly connected to the AND gates 18 and 19. In addition, a braking operation detector 26, which delivers a high level signal upon the detection of the braking operation by a brake pedal 25 (see FIG. 2), is invertedly connected to a reset input terminal R of the flip-flop 24.

With such arrangement of the rear wheel control section 9b, when it is detected that one of the rear wheels Wrl and Wrr is about to be locked by generation of high level signals λ and β from the first and second comparators 13 and 14, so that the output of the AND gate 16 is at a high level, the set output of the flip-flop 24 is at a high level until the output of the braking operation detector 26 becomes a low level at the completion of the braking operation, i.e., until the set input of the flip-flop 24 becomes a low level. Consequently, when the rear wheels Wrl and Wrr are about to be locked, the output of the output terminal 20 is at a high level until the braking operation is completed, and the hydraulic braking pressure of the rear wheel brakes Brl and Brr is maintained at a decreased level.

The operation of this embodiment is as follows. When the rear wheels Wrl and Wrr are about to be locked upon braking during travel of the vehicle, the output of the flip-flop 24 goes into a high level state in accordance with the output of the AND gate 16 going into a high level state, so that the hydraulic braking pressure of both rear wheel brakes Brl and Brr is substantially reduced to the level of atmospheric pressure by the high level signal at the output terminal 20. Moreover, such condition is continued up to the completion of the braking operation.

For this duration of time, the rear wheels Wrl and Wrr are responsive to the rotation of the front wheels Wfl and Wfr, and the hydraulic braking pressure of the front wheel brakes Bfl and Bfr is controlled in the front wheel control section 9a, whereby the rotation of the rear wheels Wrl and Wrr can be controlled, thus providing a satisfactory antilock effect.

The above embodiment has been described as being applied to a four wheel drive vehicle in which the front axles Afl and Afr are connected with the rear axles Arl and Arr through the viscous clutch 1, but the present invention is also applicable to a four wheel drive vehicle of a part time type having axles Afl, Afr and Arl, Arr interconnected through a clutch adapted to be manually shifted between engaged and disengaged states, when the clutch is in the engaged state, and to a four wheel drive vehicle having axles Afl, Afr and Arl, Arr interconnected through a differential having a locking mechanism, when the differential is in a locked state. The following is the description of embodiments applied to such four wheel drive vehicles.

Figure 5:
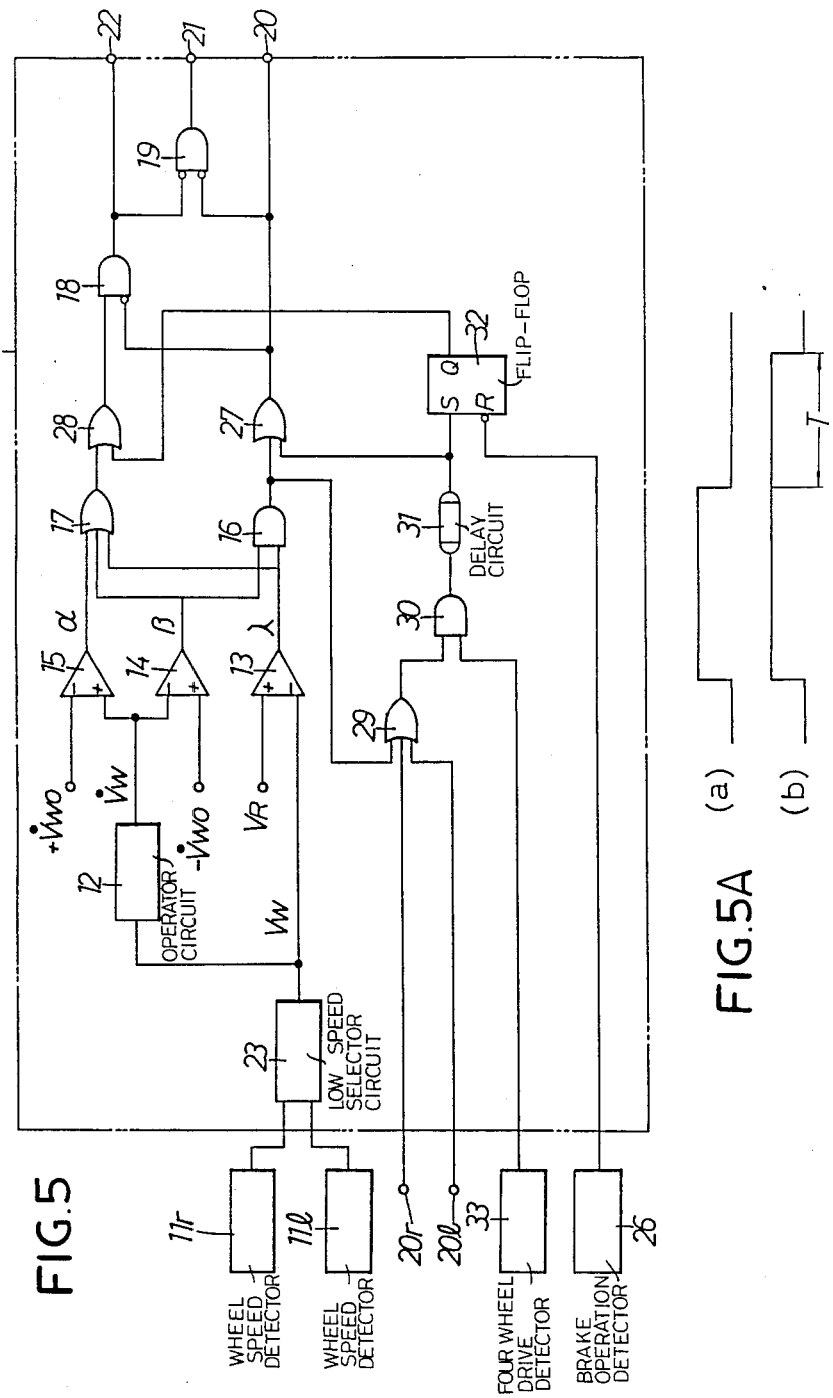
FIG. 5 is a schematic circuit diagram of a rear wheel control section according to a second embodiment of the invention.

FIG. 5 illustrates a rear wheel control section in accordance with a second embodiment of the present invention, wherein the parts corresponding to those of the first embodiment are denoted by the same reference characters.

The output terminal of AND gate 16 is connected to one of the input terminals of OR gate 27 whose output terminal is connected to output terminal 20 and invertedly connected to the input terminals of AND gates 18 and 19. The output terminal of OR gate 17 is connected to the input terminal of OR gate 28 whose output terminal is connected to the input terminal of the AND gate 18.

In addition, the output terminal of the AND gate 16 is also connected to the input terminal of an OR gate 29 having other input terminals to which are also connected output terminals 20l and 20r in the front wheel control section 9a. The output terminal of the OR gate 29 is connected to one of the input terminals of an AND gate 30. A four wheel drive state detector 33 is connected to the other input terminal of the AND gate 30. The four wheel drive state detector 33 detects the engagement of a clutch or the locked state of a differential to produce a high level signal. Thus, the output of the AND gate 30 goes into a high level state, when the hydraulic braking pressure is intended to be reduced upon slipping of either of the front wheels Wfl and Wfr or the rear wheels Wrl and Wrr.

The output terminal of the AND gate 30 is connected to a delay circuit 31. When a signal as shown in FIG. 5A (a) is fed to circuit 31 the output of delay circuit 31 increases in coordination with the increase of the input signal and falls after the lapse of a given time T from the fall of the input signal, as shown in FIG. 5A (b).

The output terminal of the delay circuit 31 is connected to an OR gate 27 and also to the set input terminal S of a flip-flop 32. A brake operation detector 26 is invertedly connected to the reset input terminal R of the flip-flop 32 whose set output terminal Q is connected to an OR gate 28.

In the operation of the second embodiment, when the rear wheels Wrl and Wrr are about to be locked during a braking operation, the output of the output terminal 20 goes into a high level state, as the output of the AND gate 16 goes into a high level state. Even after the state of the rear wheels being about to be locked is released, the output of the OR gate 27 is at a high level state up to the lapse of the given time T and hence, the output of the output terminal 20 maintains a high level state during this time T. This causes the hydraulic braking pressure of the rear wheel brakes Brl and Brr to be significantly reduced. After the lapse of the aforesaid time T, the output of the output terminal 22 becomes a high level state as the output of the AND gate 18 goes into a high level state. Such state will be maintained up to the completion of the braking operation.

Also when either of the front wheels Wfl and Wfr is about to be locked, the output of the OR gate 27 goes into a high level state in the same manner as described above, and after the lapse of the given time T, the output of the AND gate 18 becomes a high level state.

Thus, when any of the wheels Wfl, Wfr, Wrl and Wrr is about to be locked, the braking hydraulic pressure of the rear wheel brakes Brl and Brr is reduced, and such state will be maintained up to the completion of the braking operation and consequently, a satisfactory antilock effect is provided as in the first embodiment.

FIG. 6 illustrates a third embodiment of the present invention, wherein the elements corresponding to those of the second embodiment are designated by the same reference characters as in the second embodiment.

In this third embodiment, the OR gate 28 and the delay circuit 31 in the second embodiment are omitted, and the output terminal of OR gate 17 is connected to the input terminal of AND gate 18. The output terminal of AND gate 30 is connected to the set input terminal S of flip-flop 32 whose set output terminal Q is connected to the input terminal of OR gate 27.

In this third embodiment, if any of the wheels Wfl, Wfr, Wrl and Wrr is about to lock, an output from the OR gate 27, i.e., a signal derived from the output terminal 20 is at a high level state up to the completion of the braking operation, and the hydraulic braking pressure of the rear wheel brakes Brl and Brr continues to be reduced.

As seen from the above, according to the present invention, the hydraulic braking pressure in the rear wheel brakes remains reduced up to the completion of the braking operation, when any of the wheels is about to be locked. Therefore, travel stability can be maintained and an antilock control for the front wheels can be effected without and interference from the rear wheels, leading to an effective antilock control for all the wheels.

Although the invention has been described in relation to specific embodiments thereof, it will become apparent to those skilled in the art that numerous modifications and variations can be made without departing from the scope and spirit of the invention as defined in the attached claims.

What is claimed is:

1. An antilock brake device for a four wheel drive vehicle having front and rear axles, left and right wheels on each axle with brakes associated with each wheel, a power unit drivingly connected to one of said axles, the other axle being coupled for drive together with said one axle, a hydraulic braking system for controlling the hydraulic pressure applied to the brakes, and antilock control means coupled to said braking system for controlling the hydraulic braking pressure to reduce the pressure when a wheel is about to be locked, said antilock control means comprising a front wheel control section for controlling the brakes of the front wheels and a rear wheel control section for controlling the brakes of the rear wheels, and means included in said front and rear wheel control sections for keeping the hydraulic braking pressure reduced up to the completion of a braking operation, when any of the wheels is about to be locked.

2. An antilock brake device as claimed in claim 1 wherein one of said front and rear wheel control sections includes means for reducing the braking pressure in the brakes of the wheels of the axle associated with said one section and maintaining the pressure reduced during a braking operation when any of said wheels is about to be locked.

3. An antilock brake device as claimed in claim 2 wherein said one section is the rear wheel control section.

4. An antilock brake device as claimed in claim 3 wherein said means for reducing the braking pressure includes a logic element which remains in a state to reduce braking pressure when said wheel is about to be locked until the braking operation ceases.

5. Antilock brake device as claimed in claim 4 wherein said logic element comprises a flip-flop.

6. An antilock brake device as claimed in claim 5 wherein said means for reducing the braking pressure includes elements supplying a signal to said flip-flop to place the same in a state to produce an output signal during the braking operation when a wheel is about to be locked.

7. An antilock brake device as claimed in claim 6 wherein said elements include a delay circuit.

8. An antilock brake device as claimed in claim 6 wherein said vehicle is selectively connected in four wheel drive and said elements include means for detecting four wheel drive connection.

9. An antilock brake device as claimed in claim 1 comprising means drivingly connecting the front and rear axles to said power unit.

10. An antilock brake device as claimed in claim 9 wherein the means which drivingly connects the front and rear axles to said power unit includes a fluid torque transmission.

11. A method of controlling a hydraulic braking pressure supplied to brakes of a four wheel drive vehicle having left and right wheels on front and rear axles which are driven from a power unit, said method comprising sensing conditions at each wheel during braking to detect when one of said wheels is about to become locked, reducing the braking pressure to both brakes on one of said axles in response to detection that one of the wheels is about to be locked and maintaining the reduction of the braking pressure on both brakes on said one axle during the entire period of braking.

12. A method as claimed in claim 11 wherein said one axle is the rear axle.

13. A method as claimed in claim 11 wherein the detection of which wheel is about to be locked comprises detecting the speed of both wheels on said one axle and determining which of these wheels is about to be locked on the basis of the slower wheel.

14. A method as claimed in claim 13 wherein the wheels on the other of the axles are individually sensed and evaluated to determine whether they are about to become locked.

15. A method as claimed in claim 14 wherein said one axle is the rear axle.

16. A method as claimed in claim 11 wherein the four wheel drive of the vehicle can be selectively achieved and the control of the braking pressure is effected during four wheel drive.

17. A method as claimed in claim 11 wherein the conditions at the wheels on the other of said axles are sensed while the braking pressure of the brakes on the wheels on said one axle is reduced, and the braking pressure to the brakes on the wheels on said other axle is controlled solely on the basis of sensing locking of said wheels on said other axle.

18. A method as claimed in claim 12 wherein conditions at the wheels on the front axle are sensed while the braking pressure of the brakes on the wheels on the rear axle is reduced, and the braking pressure to the brakes of the wheels on the front axle is controlled on the basis of sensing locking of the wheels on said front axle independently of the reduced braking pressure to the brakes of the wheels on the rear axle.

* * * * *